United States Patent
Bugaut et al.

[11] 3,811,831
[45] May 21, 1974

[54] DYEING HAIR WITH DIAMINE AND AMINOPHENOL OXIDATION DYES AND DIAMINE OR AMINOPHENOL COUPLERS

[76] Inventors: Andree Bugaut, 7, rue des Abondances, Boulogne-sur-Seine; Francoise Estradier, 4, rue Nobel, Paris, both of France

[22] Filed: Mar. 14, 1972

[21] Appl. No.: 234,672

Related U.S. Application Data

[63] Continuation of Ser. No. 841,137, July 11, 1969, abandoned.

[30] Foreign Application Priority Data

July 15, 1968  Luxembourg.......................... 56491

[52] U.S. Cl.................................. 8/11, 8/25, 8/26, 260/574, 260/577
[51] Int. Cl............................................. D06p 1/32
[58] Field of Search.............. 8/11, 25, 26; 260/574, 260/577

[56] References Cited
FOREIGN PATENTS OR APPLICATIONS
436,574   11/1967   Switzerland............................ 8/10.2

Primary Examiner—George F. Lesmes
Assistant Examiner—Patricia C. Ives
Attorney, Agent, or Firm—Cushman, Darby & Cushman

[57] ABSTRACT

A composition for dyeing keratinic fibers, especially hair, containing an aqueous solution of an oxidation dye which can be either one having a phenyl nucleus substituted with two amino groups in para position relative to each other or one having a phenyl nucleus substituted with an amino group and a hydroxyl group in ortho or para position relative to each other, and as a coupler therefor a compound having the formula

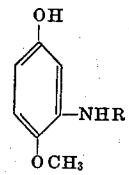

wherein R can be hydrogen, $-CH_2CH_2OH$, $-COCH_3$ or $-CH_2-CO-NH_2$. The oxidation dye to coupler ratio ranges between 10:1 and 1:4 and the composition has an alkaline pH. It is applied to the hair in the presence of an oxidizing agent for a period of about 5–30 minutes at a temperature of about 15°–40°C, after which the hair can be washed and dried.

7 Claims, No Drawings

DYEING HAIR WITH DIAMINE AND AMINOPHENOL OXIDATION DYES AND DIAMINE OR AMINOPHENOL COUPLERS

This is a continuation, of application Ser. No. 841,137, filed July 11, 1969 now abandoned.

SUMMARY OF THE INVENTION

Among the products conventionally used for dyeing keratinic fibers, and particularly human hair, are those dyeing compositions containing oxidation dyes commonly called "bases" and, in particular, ortho or paradiamines and ortho or para-aminophenols. The shades produced by these bases are varied by means of color modifiers or couplers, and in particular, by means of aromatic meta-diamines or meta-aminophenols.

The present invention relates to a new composition for dyeing keratinic fibers, and particularly human hair, which is essentially characterized by the fact that it contains:

a. At least one base selected from the group consisting of those compounds in which the molecule has an aromatic nucleus comprising two amino groups or an amino group and a hydroxyl group in ortho or para position with respect to each other.

b. At least one coupler consisting of a derivative responding to the general formula:

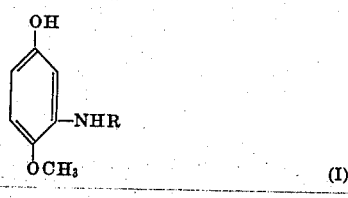

(I)

in which R is a hydrogen atom, one of the radicals

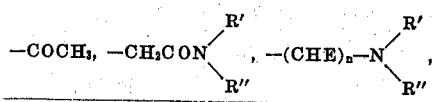

alkyl or hydroxy alkyl, and R' and R" designate a hydrogen atom or identical or different alkyls or hydroxyalkyls containing up to four carbon atoms, while E represents a hydrogen atom or a hydroxyl radical, and $n$ is a number between 2 and 4 inclusive.

It is a further object of the present invention to provide the new chemical products responding to the general formula:

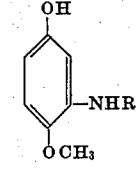

in which R is a hydrogen atom, one of the radicals

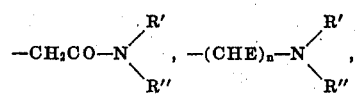

alkyl or hydroxyalkyl, and R' and R" represent a hydrogen atom or identical or different alkyls or hydroxyalkyls containing up to four carbon atoms, while E represents a hydrogen atom or a hydroxy radical and $n$ is a number between 2 and 4 inclusive.

Among the bases which may advantageously be used with the couplers responding to formula (I) are: paraphenylenediamine, paratoluylenediamine, paraaminophenol, N-methyl-para-aminophenol, chloro-para-phenylenediamine, methoxy-para-phenylenediamine, 6-methoxy-3-methyl-paraphenylenediamine, (N-ethyl, N-carbamylmethyl)-paraphenylenediamine, and 2,5-diaminopyridine.

Among the particularly useful couplers according to formula (I) are: 3-amino-4-methoxy-phenol, 3-acetylamino-4-methoxy-phenol, 3-hydroxyethylamino-4-methoxy-phenol, and 3-N-carbamylmethyl-amino-4-methoxy-phenol.

In the dyeing compositions according to the invention, the base/coupler ratio may vary within broad limits, for example, from 10/1 to 1/4, the ratio 1/1 being preferred.

The dyeing compositions according to the invention may contain other dyes suitable for use under the same conditions, such as direct dyes, such for example as azo or anthraquinone dyes, or dyes obtained by associating bases and couplers other than those according to the present invention.

The dyeing compositions according to the invention may also contain wetting agents, dispersing agents, penetrating agents, and any other ingredients conventionally used in dyeing hair. They may take the form of aqueous solutions, creams, gels, or aerosols.

The dyeing compositions according to the invention may be used in a conventional manner at an alkaline pH value, preferably about 8.5 to 10, which may be obtained by adding ammonia. The composition is applied to the hair in the presence of an oxidizing solution, preferably of hydrogen peroxide, for from 5 to 30 minutes at a temperature between 15° and 40°C. The hair is then rinsed, washed, and dried.

The new couplers according to the invention make it possible to produce a broad range of colors, and particularly green colours.

They are quite stable when exposed to the light and to inclement weather.

In order that the invention may be clearly understood, several embodiments thereof will now be described purely by way of illustration and example:

EXAMPLE I

Preparation of 3-amino-4-methoxy-phenol

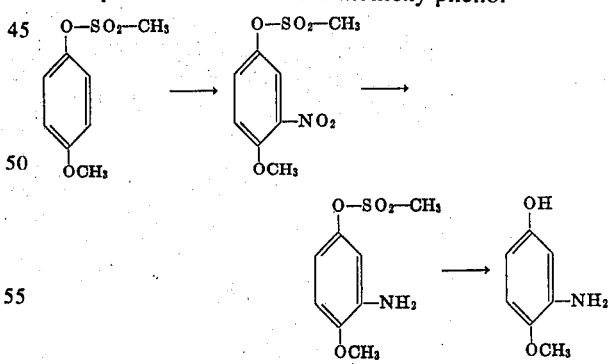

After treating 4-methoxy-mesyloxybenzene with a sulfonitric mixture, 3-nitro-4-methoxy-mesyloxybenzene is isolated. This nitro derivative is reduced to 3-amino-4-methoxy-mesyloxybenzene and, after alkaline hydrolysis of the latter compound, 3-amino-4-methoxy phenol is isolated.

First step:

Preparation of 3-nitro-4-methoxy-mesyloxybenzene:

0.5 mol (100g) of 4-methoxy-mesyloxybenzene is dissolved in 400cc of sulfuric acid at 0°C. A mixture containing 22.7cc of nitric acid (density = 1.49) and 18.5cc of concentrated sulfuric acid is added little by little, while stirring and keeping the temperature between 0° and 5°C, and the reaction mixture is then poured over ice. The crude product is drained and after recrystallization in acetic acid, yields 38g of 3-nitro-4-methoxy-mesyloxybenzene, which melts at 117°C.

Second Step:
Preparation of 3-amino-4-methoxy-mesyloxybenzene:

0.024 mol (6g) of 3-nitro-4-methoxy mesyloxybenzene is introduced little by little, while stirring, into a mixture containing 12cc of acetic acid, 30cc of water, and 8.4g of powdered iron, which has first been heated to 70°C. After the addition has been completed, the reaction mixture is heated for 20 minutes in a boiling water bath, and then filtered while boiling. The filtrate is cooled and drying yields 3.7g of 3-amino-4-methoxy mesyloxybenzene which, after recrystallization in benzene, melts at 84°C.

Third step:
Preparation of 3-amino-4-methoxy phenol:

0.0276 mol (6g) of 3-amino-4-methoxy mesyloxybenzene is treated with 85cc of a 2N sodium hydroxide solution at 70°C for two hours. The reaction mixture is cooled, and neutralized with hydrochloric acid. Drying yields 3.4g of 3-amino-4-methoxy phenol which, after recrystallization in benzene, melts at 116°C.

EXAMPLE II

Preparation of 3-N, β-hydroxyethylamino-4-methoxy-phenol

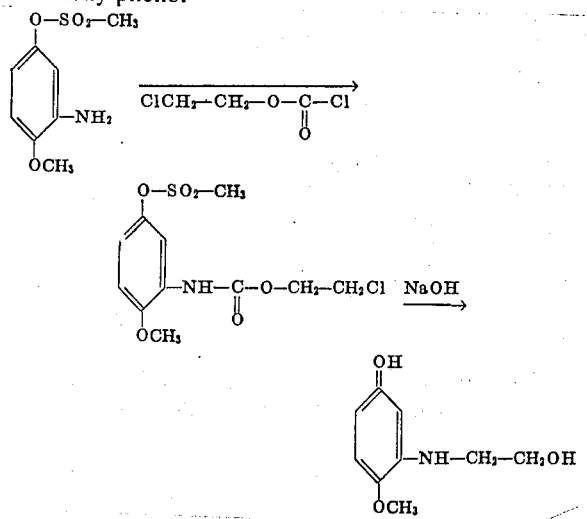

First step:
Preparation of N[(2-methoxy-5-mesyloxy)-phenyl] carbamate of β-chlorethyl.

0.3 mol (65.1g) of 3-amino-4-methoxy mesyloxybenzene is dissolved in 200cc of dioxane. 0.22 mol (22g) of calcium carbonate is then added. The mixture is heated to reflux and 0.31 mol (44.33g) of β-chloroethyl chloroformate is added little by little. After heating for 30 minutes, the mixture is filtered while boiling. After diluting the filtrate with water, drying yields 82g of the N-arylcarbamate of β-chlorethyl sought, which, after recrystallization in ethyl alcohol, melts at 94°C.

Second step:
Preparation of 3-N-β-hydroxyethylamino-4-methoxy-phenol.

0.031 mol (10g) of N-[(2-methoxy-5-mesyloxy)-phenyl] carbamate of β-chlorethyl is added to 100cc of a 4N sodium hydroxide solution. The mixture is brought to reflux for one hour under a nitrogen atmosphere. The reaction mixture is cooled and acidified with a 5N hydrochloric acid solution to a pH of 6. Drying yields 5g of 3-N-β hydroxyethylamino-4-methoxy phenol which, after recrystallization in water, melts at 108°C.

EXAMPLE III

Preparation of 3-N-carbamylmethylamino-4-methoxy-phenol

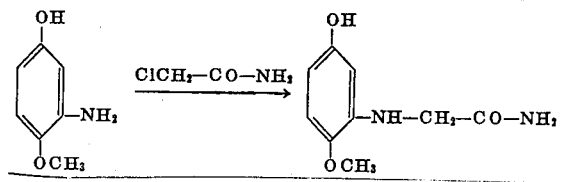

0.05 mol (6.95g) of 3-amino-4-methoxy phenol and 0.054 mol (5.05g) of chloroacetamide are added to 100cc of water. The solution is heated to reflux and 0.037 mol (3.7g) of calcium carbonate in suspension in 10cc of water is added drop by drop to keep the pH at 7. The mixture is kept at reflux for an hour and then filtered while boiling.

After cooling the filtrate, drying yields 6g of 3-N-carbamylmethylamino-4-methoxy-phenol which, after recrystallization in water, melts at 183°.

EXAMPLE IV

The following dyeing solution is prepared:

| | |
|---|---|
| – para-tolylenediamine | 1 |
| – 3-amino-4-methoxy-phenol | 1 |
| – lauryl ammonium sulfate containing 20% fatty alcohol | 20 |
| – ethylene-diamino tetra-acetic acid (sold under the trademark "TRILON B") | 0.3 |
| – 20% ammonia | 10 |
| – 40% sodium bisulfite | 1 |
| – water, q.s.p. | 100 |

This solution, when mixed with an equal weight of 6 percent hydrogen peroxide, and applied for 30 minutes to 100 percent white hair, yields a reddish brown.

EXAMPLE V

The following dyeing solution is prepared:

| | |
|---|---|
| – 6-methyl-3-methoxy-1,4-diamino benzene | 1 |
| – 3-amino-4-methoxy-phenol | 1 |
| – lauryl ammonium sulfate containing 20% fatty alcohol | 20 |
| – ethylene-diamino-tetra-acetic acid (sold under the trademark "TRILON B") | 0.3 |
| – 20% ammonia | 10 |
| – 40% sodium bisulfite | 1 |
| – water, q.s.p. | 100 |

This solution, when mixed and applied under the same conditions as above, results in a bottle green.

EXAMPLE VI

The following dyeing solution is prepared:

| | |
|---|---|
| – para-aminophenol | 1 |
| – 3-amino-4-methoxy-phenol | 1.2 |
| – lauryl ammonium sulfate containing 20% fatty alcohol | 20 |
| – ethylene-diamino-tetra-acetic acid (sold under the trademark "TRILON B") | 0.3 |
| – 20% ammonia | 10 |
| – 40% sodium bisulfite | 1 |
| – water, q.s.p. | 100 |

This solution, when mixed and applied under the same conditions as above, yields a mahogany blond.

EXAMPLE VII

The following dyeing solution is prepared:

| | |
|---|---|
| - N-ethyl-N-carbamylmethyl-1,4-diamino-benzene | 1 |
| - 4-methoxy-3-acetylamino phenol | 0.9 |
| - lauryl ammonium sulfate containing 20% fatty alcohol | 20 |
| - ethylene-diamino-tetra-acetic acid (sold under the trademark "TRILON B") | 0.3 |
| - 20% ammonia | 10 |
| - 40% sodium bisulfite | 1 |
| - water, q.s.p. | 100 |

This solution, when mixed and applied under the same conditions as above, produces a turquoise green.

EXAMPLE VIII

The following dyeing solution is prepared:

| | |
|---|---|
| - 6-methoxy-1,4-diamino-benzene | 1 |
| - 4-methoxy-3-acetylamino phenol | 1.1 |
| - lauryl ammonium sulfate containing 20% fatty alcohol | 20 |
| - ethylene-diamino-tetra-acetic acid (sold under the trademark "TRILON B") | 0.3 |
| - 20% ammonia | 10 |
| - 40% sodium bisulfite | 1 |
| - water, q.s.p. | 100 |

This solution, when mixed and applied under the same conditions as above, yields a golden green.

EXAMPLE IX

The following dyeing solution is prepared:

| | |
|---|---|
| - chloroparaphenylenediamine | 1 |
| - 4-methoxy-3-acetyl-amino-phenol | 1.3 |
| - lauryl ammonium sulfate containing 20% fatty alcohol | 20 |
| - ethylene-diaminotetra-acetic acid (product sold under the trademark "TRILON B") | 0.3 |
| - 20% ammonia | 10 |
| - 40% sodium bisulfite | 1 |
| - water, q.s.p. | 100 |

This solution, when mixed with an equal weight of 6 percent hydrogen peroxide and applied to 100 percent white hair, yields a violet color at the end of 30 minutes.

EXAMPLE X

The following dyeing solution is prepared:

| | |
|---|---|
| - para-tolylene-diamine | 1 |
| - para-amino-phenol | 0.5 |
| - resorcinol | 0.1 |
| - 3-amino-4-methoxy-phenol | 1.6 |
| - lauryl ammonium sulfate containing 20% fatty alcohol | 20 |
| - ethylene-diamino-tetra acetic acid (sold under the trademark "TRILON B") | 0.3 |
| - 20% ammonia | 10 |
| - 40% sodium bisulfite | 1 |
| - water, q.s.p. | 100 |

This solution is mixed with an equal weight of 6 percent hydrogen peroxide and applied to 100 percent white hair. After 30 minutes this produces a violet brown which is stable when exposed to light.

EXAMPLE XI

The following solution is prepared:

| | |
|---|---|
| - 3-N-$\beta$-hydroxyethylamino-4-methoxy-phenol | 0.46 |
| - 2,5-diamino-anisole dihydrochloride | 0.53 |
| - 20% ammonia | 15 |
| - water, q.s.p. | 100 |

This solution is mixed with an equal weight of 6 percent hydrogen peroxide and this mixture is applied to 90 percent white hair for 30 minutes. The hair is then rinsed, shampooed and dried. The result is a bronze green with metallic glints.

EXAMPLE XII

The following solution is prepared:

| | |
|---|---|
| - 3-N-carbamyl-methyl-amino-4-methoxy-phenol | 0.4 g |
| - 2,5-diamino-anisole dihydrochloride | 0.53 |
| - lauryl ammonium sulfate containing 20% fatty alcohol | 20 |
| - ethylene diamine tetracetic acid | 0.3 |
| - 20% ammonia | 15 |
| - 40% sodium bisulfite | 1 |
| - water, q.s.p. | 100 |

This solution is mixed with an equal weight of 6 percent hydrogen peroxide, and this mixture is applied to 90 percent white hair for 30 minutes. The hair is then rinsed, shampooed and dried. The result is a bronze green with metallic glints.

EXAMPLE XIII

The following solution is prepared:

| | |
|---|---|
| - 3-N-carbamylmethyl-amino-4-methoxy-phenol | 0.4 |
| - para-tolylene diamine | 0.3 |
| - lauryl ammonium sulfate containing 20% fatty alcohol | 20 |
| - ethylene diamine tetracetic acid | 0.3 |
| - 20% ammonia | 10 |
| - 40% sodium bisulfite | 1 |
| - water, q.s.p. | 100 |

This solution is mixed with an equal weight of 6 percent hydrogen peroxide. This mixture is applied to 90 percent white hair for 30 minutes. The hair is then rinsed, shampooed and dried. The result is a rose beige.

EXAMPLE XIV

The following solution is prepared:

| | |
|---|---|
| - 3-amino-4-methoxy-phenol | 0.1 |
| - para-tolylene diamine | 0.5 |
| - meta-amino-phenol | 0.08 |
| - para-amino-phenol | 0.4 |
| - nitro-para-phenylene diamine | 0.04 |
| - lauryl ammonium sulfate containing 20% fatty alcohol | 20 |
| - ethylene diamine tetracetic acid | 0.3 |
| - 20% ammonia | 10 |
| - 40% sodium bisulfite | 1 |
| - water, q.s.p. | 100 |

This solution is mixed with an equal weight of 6 percent hydrogen peroxide and applied to 90 percent white hair for 30 minutes. The hair is then rinsed, shampooed, and dried. The result is a golden brown.

EXAMPLE XV

The following solution is prepared:

| | |
|---|---|
| - para-tolylene diamine | 0.3 |
| - meta-amino phenol | 0.06 |
| - para-amino phenol | 0.3 |

EXAMPLE XV-Continued

The following solution is prepared:

| | |
|---|---|
| - N-acetyl-3-amino-4-methoxy-phenol | 0.05 |
| - nitro-paraphenylene diamine | 0.3 |
| - lauryl ammonium sulfate containing 20% fatty alcohol | 20 |
| - ethylene diamine tetracetic acid | 0.3 |
| - 20% ammonia | 10 |
| - 40% sodium bisulfite | 1 |
| - water, q.s.p. | 100 |

This solution is mixed with an equal weight of 6 percent hydrogen peroxide and applied to 90 percent white hair for 30 minutes. The hair is then rinsed, shampooed and dried. The result is a mahogany brown.

What is claimed is:

1. A composition for dyeing keratinic fibers comprising an aqueous solution of an oxidation dye selected from the group consisting of (1) a dye having a phenyl nucleus substituted with two amino groups in para position relative to each other and (2) a dye having a phenyl nucleus substituted with an amino group and a hydroxyl group in ortho or para position relative to each other, and as a coupler therefor a compound having the formula

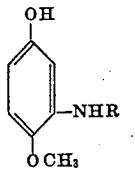

wherein R is selected from the group consisting of hydrogen, $-CH_2CH_2OH$, $-COCH_3$ and $-CH_2-CO-NH_2$, the oxidation dye to coupler ratio being between 10/1 and 1/4 and said composition having an alkaline pH.

2. The composition of claim 1 in which said oxidation dye is selected from the group consisting of paraphenylenediamine, paratolylenediamine, paraaminophenol, N-methyl-para-aminophenol, chloro-para-phenylenediamine, methoxy-para-phenylenediamine, 6-methoxy-3-methyl-paraphenylenediamine and (N-ethyl, N-carbamylmethyl)-paraphenylenediamine.

3. The composition of claim 1 which also contains nitroparaphenylene diamine.

4. The composition of claim 1 having a pH value between 8.5 and 10.

5. A method for dyeing hair comprising impregnating said hair, in amounts effective to color said hair, for a period between 5-30 minutes at a temperature between 15°-40°C, with an aqueous solution having a pH between 8.5-10 of an oxidation dye selected from the group consisting of (1) a dye having a phenyl nucleus substituted with two amino groups in para position relative to each other and (2) a dye having a phenyl nucleus substituted with an amino group and a hydroxyl group in ortho or para position relative to each other, and as a coupler therefor a compound having the formula

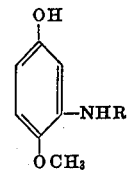

wherein R is selected from the group consisting of hydrogen, $-CH_2CH_2OH$, $-COCH_3$ and $-CH_2-CO-NH_2$, the oxidation dye to coupler ratio being between 10/1 and 1/4, and in the presence of hydrogen peroxide in amounts effective to oxidize said oxidation dye.

6. The method of claim 5 which includes the steps of washing and drying the hair after said 5 to 30 minutes.

7. The method of claim 5 wherein said hydrogen peroxide is 6 percent aqueous hydrogen peroxide solution.

* * * * *

UNITED STATES PATENT OFFICE
CERTIFICATE OF CORRECTION

Patent No. 3,811,831　　　　　　　　Dated May 21, 1974

Inventor(s) Andree Bugaut and Francoise Estradier

It is certified that error appears in the above-identified patent and that said Letters Patent are hereby corrected as shown below:

In the Heading:

Please insert the following:

[13] Assignee:　Societe anonyme dite: L'Oreal
　　　　　　　　Paris, France

Signed and sealed this 22nd day of October 1974.

(SEAL)
Attest:

McCOY M. GIBSON JR.　　　　　　　　C. MARSHALL DANN
Attesting Officer　　　　　　　　　Commissioner of Patents